United States Patent [19]

Whightsil, Sr.

[11] Patent Number: 5,209,461
[45] Date of Patent: May 11, 1993

[54] ELASTOMERIC TORSIONAL SPRING HAVING TANGENTIAL SPOKES WITH VARYING ELASTIC RESPONSE

[75] Inventor: Gary L. Whightsil, Sr., Kennedale, Tex.

[73] Assignee: LTV Energy Products Company, Houston, Tex.

[21] Appl. No.: 898,242

[22] Filed: Jun. 12, 1992

Related U.S. Application Data

[63] Continuation of Ser. No. 556,893, Jul. 23, 1990.

[51] Int. Cl.$^5$ .................................. F16F 1/06
[52] U.S. Cl. ...................... 267/155; 267/154; 267/279; 482/121
[58] Field of Search ................ 267/152–157, 267/161, 181, 189, 257–258, 272–273, 275, 281–283, 221, 202, 199, 279–280, 150; 482/121, 127, 130

[56] References Cited

U.S. PATENT DOCUMENTS

| | | | |
|---|---|---|---|
| 2,846,210 | 8/1958 | Carrier, Jr. | 267/153 |
| 2,915,306 | 12/1959 | Hickman | 267/281 X |
| 3,752,475 | 8/1973 | Ott | 482/127 |
| 4,008,782 | 2/1977 | Chanal | 180/132 |
| 4,235,439 | 11/1980 | De Donno | 482/116 |
| 4,625,961 | 12/1986 | Brand | 482/116 |
| 4,635,755 | 1/1987 | Arechaga | 267/156 X |
| 4,647,035 | 3/1987 | Yellen | 482/72 |
| 4,647,041 | 3/1987 | Whiteley | 482/118 |
| 4,784,006 | 11/1988 | Kethley | 74/84 R |
| 4,826,145 | 5/1989 | Moore et al. | 267/154 X |
| 4,944,511 | 7/1990 | Francis | 272/137 |

FOREIGN PATENT DOCUMENTS

| | | | |
|---|---|---|---|
| 0934800 | 3/1956 | Fed. Rep. of Germany | 267/153 |
| 0182097 | 5/1961 | Sweden | 267/153 |

*Primary Examiner*—Matthew C. Graham
*Assistant Examiner*—Josie A. Ballato
*Attorney, Agent, or Firm*—Arnold, White & Durkee

[57] ABSTRACT

A torsional spring 10 includes an outer cylinder 12 connected to a central hub 14 through a series of elastomeric spokes 16–30. The elastomeric spokes 16–30 extend from the inner periphery of the cylinder 12 to the hub 14 substantially along a line tangential to the central hub 14. Further, each of the elastomeric spokes 16–30 includes first and second radial segments wherein the first radial segment is adjacent the hub 14 and has an elastic modulus that is lower than the second radial segment.

15 Claims, 2 Drawing Sheets

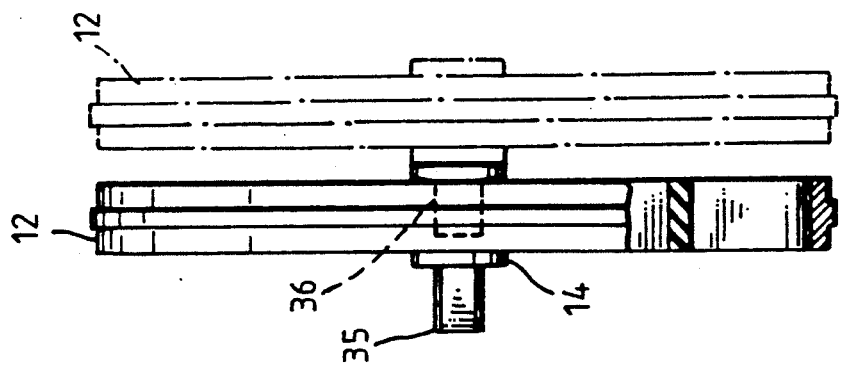
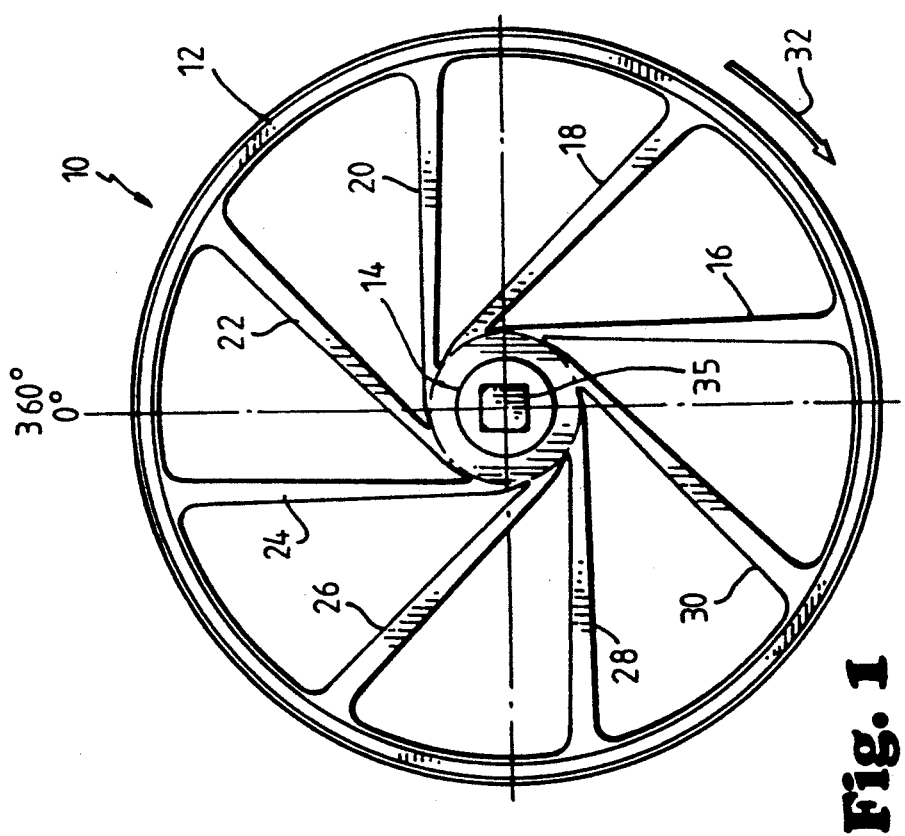

ELASTOMERIC TORSIONAL SPRING HAVING TANGENTIAL SPOKES WITH VARYING ELASTIC RESPONSE

This is a continuation of copending application Ser. No. 07/556,893 filed on Jul. 23, 1990.

BACKGROUND OF THE INVENTION

1. Field of the Invention

This invention relates generally to a torsional spring for use in exercise equipment and, more particularly, to a torsional spring formed from a plurality of elastomeric spokes connected between an outer cylinder and a rotatable central hub.

2. Description of the Related Art

Designers have long attempted to produce exercise equipment that has the advantages of being lightweight and portable in design, but still requires extensive physical exertion, so as to emulate heavy weight systems. For example, it has been common for designers to replace heavy weights with frictional devices to controllably resist movement by a user. One example of such a frictional device is illustrated in U.S. Pat. No. 4,647,041 issued Mar. 3, 1987 to Neville C. Whiteley. In that device, increased resistance to movement is generated by increasing the force tending to hold a pair of surface engaging plates together.

Alternatively, other prior art devices have suggested the use of a spring mechanism to provide the desired resistance to movement by a user of the device. For example, U.S. Pat. No. 3,752,475 issued Aug. 4, 1973 to Arnold C. Ott discloses an exercise wheel that is rotatable about an axle and has a spring means operatively associated with the wheel and axle for increasing resistance to rotation of the wheel relative to the axle. Several embodiments of the spring means are illustrated, including a series of resilient elements, such as rubber bands. The rubber bands are connected between the wheel and the axle so that as the wheel rotates about the axle the rubber bands are stretched and wrapped around the axle. The stretching rubber bands exhibit increasing resistance to movement of the wheel so that a user must exhibit considerable force to rotate the wheel. However, rubber bands suffer from the inherent disadvantage that, owing to their repeated exposure to high stress, they have a relatively short fatigue life and are in need of frequent repair and replacement.

More specifically, as the wheel is rotated relative to the axle, the rubber bands are stretched and wrapped about the axle. The first portions of the rubber bands that are in actual contact with the axle cease to stretch when they come in contact with the axle. These first portions of the rubber bands are, therefore, subject to a relatively small amount of strain. The second portions of the rubber bands that are not in contact with the axle continue to stretch and are subject to substantially higher amounts of strain. Thus, since the fatigue life of the rubber band is directly related to the peak strain, the second portions of the rubber bands have a relatively shorter fatigue life than the first portions of the rubber bands. The overall fatigue life of the rubber bands is, of course, determined by the relatively short fatigue life of the second portion.

The present invention is directed to overcoming one or more of the problems set forth above.

SUMMARY OF THE INVENTION

In one aspect of the present invention, a torsional spring includes a cylinder having an inner and outer circumferential surface, a hub positioned substantially centrally within the cylinder, and a plurality of elastomeric spokes extending radially between the inner circumferential surface of the cylinder and the hub. Each of the elastomeric spokes is formed from first and second radial segments wherein the first radial segment has a lower elastic modulus than the second radial segment.

In another aspect of the present invention, a torsional spring includes a cylinder having an inner and outer circumferential surface, a hub positioned substantially centrally within the cylinder, and a plurality of elastomeric spokes extending radially between the inner circumferential surface of the cylinder and the hub along a line substantially tangential to the hub. Each of the elastomeric spokes is formed from first and second radial segments wherein the first radial segment is adjacent the hub and has a lower elastic modulus than the second radial segment.

In yet another aspect of the present invention, a torsional spring includes a cylinder having an inner and outer circumferential surface, a hub positioned substantially centrally within the cylinder, and a plurality of elastomeric spokes extending radially between the inner circumferential surface of the cylinder and the hub along a line substantially tangential to the hub.

In still another aspect of the present invention, a torsional spring for use in an exercise machine includes a cylinder, a hub centered within the cylinder, and a plurality of elastomeric spokes arcuately distributed between the cylinder and the hub. The inner end of each spoke is bonded generally tangential to the hub and the outer end of each spoke is bonded to the cylinder. Each of the inner ends of the spokes has a lower elastic modulus than the elastic modulus of the outer end.

BRIEF DESCRIPTION OF THE DRAWINGS

Other objects and advantages of the invention will become apparent upon reading the following detailed description and upon reference to the drawings in which:

FIG. 1 illustrates a side view of a torsional spring embodying the principles of the instant invention;

FIG. 2 illustrates a partial cross sectional end view of a torsional spring embodying the principles of the instant invention;

Figure 4:
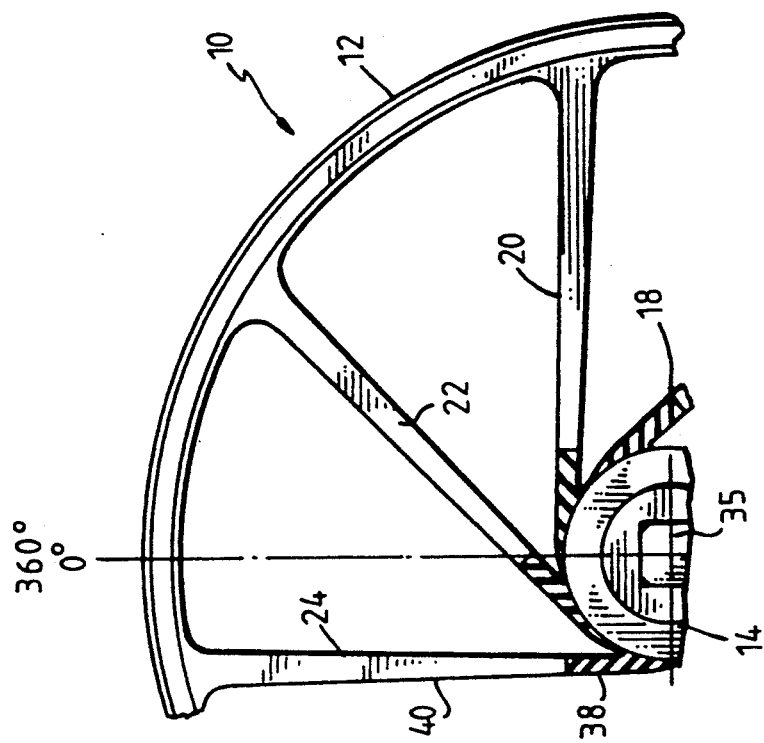
FIG. 4 illustrates a side view of an alternative embodiment of a torsional spring embodying the principles of the instant invention.

While the invention is susceptible to various modifications and alternative forms, specific embodiments thereof have been shown by way of example in the drawings and will herein be described in detail. It should be understood, however, that specification is not intended to limit the invention to the particular forms disclosed therein, but on the contrary, the intention is to cover all modifications, equivalents, and alternatives falling within the spirit and scope of the invention, as defined by the appended claims.

DESCRIPTION OF THE PREFERRED EMBODIMENTS

Turning to the drawings and referring first to FIG. 1, a side view of a torsional spring 10 is illustrated. The torsional spring 10 has been specifically designed for use in exercise equipment of the type described in co-pending U.S. application No. 300,563. However, the torsional spring 10 is readily adaptable for use in any other environment where lightweight, long-lived springs are useful. Thus, the torsional spring 10 is not limited to the field of exercise equipment.

The torsional spring 10 includes a cylinder 12 constructed from any suitably stiff material so as to resist substantial deformation thereof. For example, the cylinder 12 can be constructed from any of a variety of metals, such as mild steel, or may take the form of nylon, plastic, or any suitable composite material.

The cylinder 12 is connected to a central hub 14 through a series of eight elastomeric spokes 16, 18, 20, 22, 24, 26, 28, and 30. Like the cylinder 12, the central hub 14 is constructed from any suitably stiff material so as to resist substantial deformation thereof. For example, the central hub 14 can be constructed from any of a variety of metals, such as mild steel or may take the form of nylon, plastic, or any suitable composite material.

The elastomeric spokes 16-30 are connected to the inner periphery of the cylinder 12 at regularly spaced circumferential intervals of approximately 45 degrees. The number and spacing of the elastomeric spokes 16-30 are not critical to operation of the torsional spring 10 but are at least partially determinative of the force required to rotate the cylinder 12 relative to the hub 14. The elastomeric spokes 16-30 are of substantially identical length so that the central hub 14 is disposed at about the center point of the cylinder 12.

Figure 3:
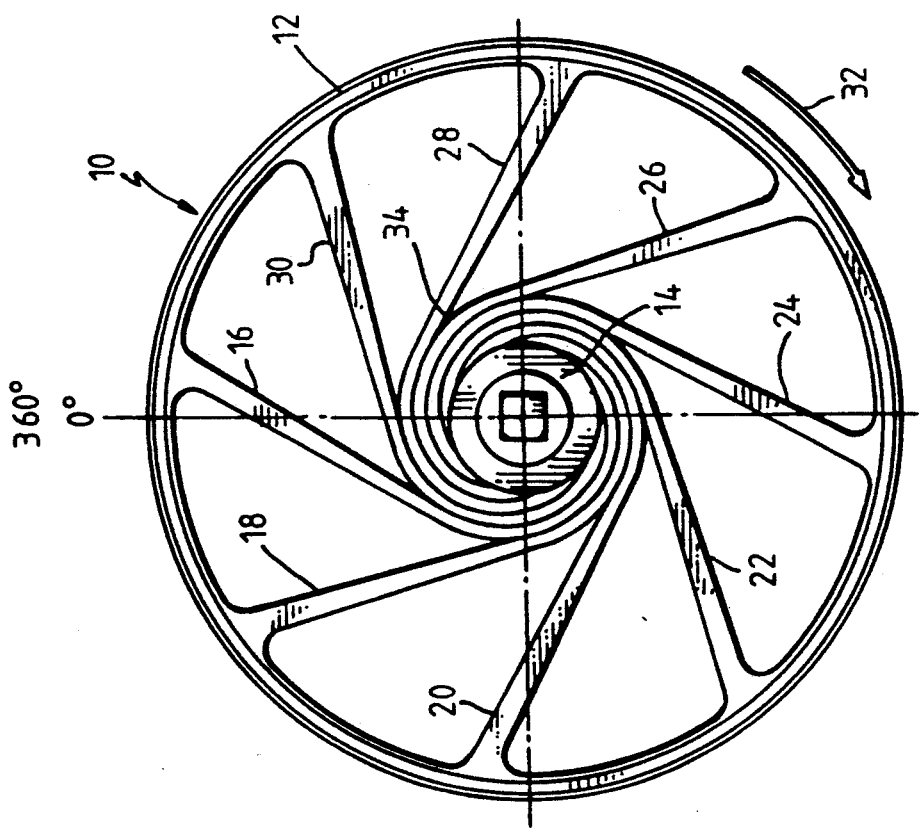
FIG. 3 illustrates a side view of the torsional spring of FIG. 1 in a stressed configuration.

Thus, it can be seen that rotation of either the central hub 14 or the cylinder 12 relative to the other causes the elastomeric spokes 16-30 to stretch and wrap about the central hub 14 (as illustrated in FIG. 3). The stretching action of the elastomeric spokes 16-30 is, of course, resisted by a force corresponding to the thickness and number, as well as the composition of the elastomeric spokes 16-30. Thus, while the number and spacing of the elastomeric spokes is not critical, it is determinative of the overall spring force of the torsional spring 10.

The elastomeric spokes 16-30 are constructed from any suitable elastomeric polymer, but a blend of the two polymers natural rubber and polybutadiene in the ratio of approximately 80% natural rubber to 20% polybutadiene has exhibited an acceptable fatigue life. For example, a torsional spring of the type discussed herein has been shown to have a useful life in excess of 100,000 cycles of rotating the cylinder 12 relative to the hub 14 through an angle of approximately 200 degrees. The elastomeric spokes 16-30 are preferably molded in place and bonded to the cylinder 12 and hub 14 by, for example, the use of commercially available coating systems. The cylinder 12 and hub 14 are placed in and become part of the mold used to form the elastomeric spokes 16-30. The elastomeric compound is preferably injected into the mold so that formation of the torsional spring 10 is substantially completed when the elastomeric compound is injected into the mold. In other words, the bonding and injecting processes occur at substantially the same time.

It should be appreciated that the elastomeric spokes 16-30 are the most likely component of the torsional spring 10 to exhibit a relatively short fatigue life. In fact, the fatigue life of the torsional spring 10 has been shown to be directly correlated to the peak strain exhibited within each elastomeric spoke 16-30.

Further, the peak strain is a direct function of the length of each of the elastomeric spokes 16-30. In other words, the longer the spoke, the lower the peak strain, and the longer the fatigue life. Therefore, it should be apparent that the life of the spring 10 may be extended by lengthening the elastomeric spokes 16-30 by designing the cylinder 12 with an increased overall diameter. However, it is also desireable that exercise equipment employing the torsional spring 10 be lightweight and have a small, portable design. Therefore, the physical packaging restraints imposed on the torsional spring 10 limit the designers' ability to increase the length of the elastomeric spokes 16-30 by increasing the diameter of the cylinder 12.

Rather, the elastomeric spokes 16-30 of the torsional spring 10 described herein are provided with their maximum possible length for a given diameter of the cylinder 12 by extending the spokes 16-30 from the inner periphery of the cylinder 12 to the hub 14 along a line substantially tangential to the inner hub 14. In this manner, the length of the elastomeric spoke 16-30 is maximized for a given diameter of the cylinder 12.

Further reduction of the peak strain exhibited in each of the elastomeric spokes 16-30 is achieved by varying the elastic modulus of each of the elastomeric spokes 16-30 over their radial length. For example, as the cylinder 12 is rotated in a clockwise direction relative to the hub 14 (as indicated by arrow 32), each of the elastomeric spokes 16-30 stretches and wraps around the inner hub 14. Generally, the portion of each of the elastomeric spokes 16-30 that is in contact with the central hub 14 and the underlying elastomeric spokes no longer stretches. Rather, any additional stretching that occurs within the elastomeric spokes 16-30 is confined to the region of the elastomeric spokes 16-30 between the inner periphery of the cylinder 12 and the last point of contact between the hub 14 or underlying elastomeric spokes and each of the elastomeric spokes 16-30. Thus, the portion of the elastomeric spokes 16-30 that contacts the hub 14 or underlying elastomeric spokes ceases to stretch at a relatively low strain while the portion of the elastomeric spokes 16-30 that are not in contact with the hub 14 or underlying spokes continue to stretch and, therefore, attain a much higher strain.

This can best be seen in FIG. 3 where the last point of contact for the elastomeric spoke 28 is indicated by reference numeral 34. It should be appreciated that the phrase "last point of contact" is a relative term and indicates the last point of contact for a preselected rotation. For example, the last point of contact identified by reference numeral 34 corresponds to the location where the last point of contact occurs for a rotation of 200 degrees. Additional rotation beyond 200 degrees causes the spoke 28 to further wrap around the hub 14 and underlying spokes so that the last point of contact is located radially outward from the last point of contact identified by reference numeral 34. Thus, the effective length of the elastomeric spoke 28 is substantially shorter since subsequent stretching beyond 200 degrees occurs only in the region between reference numeral 34 and the inner periphery of the cylinder 12. Therefore, the peak strain experienced by the elastomeric spoke 28 occurs within this effectively shortened length and is substantially higher than the peak strain experienced by the portion of the elastomeric spoke that contacts the hub 14 or underlying elastomeric spokes.

However, in the embodiments described herein the peak strain in the elastomeric spokes 16-30 is reduced by decreasing the elastic modulus of each of the elastomeric spoke 16-30 in a first radial segment of each of the elastomeric spokes that is adjacent the hub 14. In other words, the first radial section of each of the elastomeric spokes 16-30 is more elastic than the remaining radial segment of each of the elastomeric spoke 16-30. In this manner, the first radial segment of each of the elastomeric spokes 16-30 stretches further to increase the peak strain in the first radial segment. Increased strain in the first radial segment results in a lower peak strain in the second radial segment, thereby reducing the overall peak strain in the elastomeric spokes 16-30.

Further, it is desireable that the elastic modulus of the elastomeric spokes 16-30 vary along the radial length of the elastomeric spoke at least within the portion of the elastomeric spoke that wraps around and comes into contact with the hub 14 and underlying spokes. For example, it is desireable that the elastomeric spoke 28 have an elastic modulus that varies in the radial segment between the last point of contact 34 and its connection to the hub 14. The location of the last point of contact 34 is determined by the expected rotation of the cylinder 12 relative to the hub 14. For example, if the expected use for the spring 10 confines its rotational movement to 200 degrees then the location identified by reference numeral 34 reflects the location of the last point of contact.

Within this first radial segment it is desireable that the elastic modulus vary at a rate corresponding to its distance from the hub. It should be appreciated that the first segments of the elastomeric spoke 16-30 that are closer to the hub 14 contact the hub 14 earlier in the rotation and thus, cease to stretch at a much lower level of strain. Therefore, it is desireable that the elastomeric spokes 16-30 have a greater elasticity immediately adjacent the hub 14 than at the last point of contact.

The magnitude of the elastic modulus of each of the elastomeric spokes 16-30 is controlled by varying the cross-sectional area of each of the elastomeric spokes 16-30 in proportion to the distance from the hub 14. In other words, increases with increasing distance from the hub 14. The cross-sectional area of each of the elastomeric spokes 16-30 is accomplished by varying at least one of the axial and circumferential dimensions of each of the elastomeric spokes 16-30. In the preferred embodiment illustrated herein, the circumferential dimension of each of the elastomeric spokes 16-30 increases with increasing distance from the hub 14. In other words, the elastomeric spokes 16-30 are tapered so that they have a narrower circumferential width adjacent the spokes 16-30 are less stiff in the radial segment adjacent the hub than in the radial segment adjacent the cylinder 12. Preferably, the elastomeric spokes 16-30 are tapered at an angle of approximately 1.5 degrees.

Referring now simultaneously to FIGS. 1 and 2, one method for increasing resistance to rotational movement is illustrated. The torsional spring 10 is readily "stackable" with similarly configured torsional springs 10 so that both of the springs 10 operate in tandem, effectively resisting rotation thereof with twice the force of a single torsional spring 10.

To stack the torsional springs 10, the hub 14 includes a drive mechanism 35 extending from a first axial end portion of said hub 14. The hub 14 also has a recess 36 extending into its second axial end portion. Both the drive mechanism 35 and the recess 36 have substantially similar cross-sectional configurations so that the recess 36 readily receives a drive mechanism 35 of a similarly configured torsional spring 10. Thus, the hubs 14 of the torsional springs 10 are mated together and cannot rotate relative to one another.

Alternatively, increased resistance to rotation of the torsional spring 10 is effected by increasing the thickness of each of the elastomeric spokes 16-30 (either in the circumferential or axial direction), or by increasing the total number of elastomeric spokes 16-30. Thus, it should be readily appreciated that exercise equipment employing the torsional spring 10 may be readily configured to a desired resistance by selecting torsional springs of various axial sizes or by stacking torsional springs 10 to arrive at a desired combination of resistance, or through a combination of the two methods.

The elastomeric spokes 16-30 are shown connected to the cylinder 12 wherein the circumferential side walls of the elastomeric spokes 16-30 are connected at slightly different angles to the cylinder 12. Preferably, the connection point between the elastomeric spoke 16-30 and the cylinder 12 occurs through a radius section of the elastomeric spoke 16-30. Preferably, the counterclockwise side and clockwise side radiuses of the elastomeric spokes 16-30 are ⅛ of an inch and ¼ of an inch, respectively.

Referring now to FIG. 4, a partial view of an alternative embodiment of the torsional spring 10 is illustrated. Elastomeric spokes 18-24 are each shown having first and second radial segments 38, 40. The first radial segment 38 is constructed from a compound having a first preselected elastic modulus while the second radial segment 40 is formed from a compound that has a second, higher preselected elastic modulus, the variation in the elastic modulus being achieved by appropriate compounding. In this manner, the first radial segment 38 has a lower elastic modulus then the second radial segment 40 and, therefore, like the first radial segment 38 of the embodiment illustrated in FIGS. 1-3, it is less stiff and stretches to a greater length than the second radial segment 40. Thus, the peak strain experienced by the first radial segment 38 is increased while the peak strain experience by the second radial segment 40 is correspondingly decreased so as to decrease the overall peak strain experience by the elastomeric spoke 24.

The first and second radial segments 38, 40 are formed from different compounds during the molding stage of the construction of the torsional spring 10. For example, the cylinder 12 and hub 14 are located within and form part of the mold for receiving the elastomeric compounds. The compounds are then injected into their corresponding regions to fill the mold and thereby form the elastomeric spokes 16-30. By controlling the location and rate of injection of the different compounds, the first and second radial segments 38, 40 are readily formed.

I claim:
1. A torsional spring, comprising:
 a cylinder having an inner and outer circumferential surface;
 a hub positioned substantially centrally within said cylinder; and a plurality of elastomeric spokes extending radially between said inner circumferential surface of said cylinder and said hub, each of said elastomeric spokes being formed from first and second elastomeric radial segments wherein the first radial segment has a lower elastic modulus than the second radial segment, said elastomeric spokes being adapted for resisting rotational movement of said hub relative to said cylinder throughout the entire range of motion of said hub relative to said cylinder by being placed in tension.

2. A torsional spring, as set forth in claim 1, wherein said first radial segment is formed from a first elastomeric material and said second radial segment is formed from a second elastomeric material wherein said first elastomeric material has a lower elastic modulus than said second elastomeric material.

3. A torsional spring, as set forth in claim 2, wherein said first radial segment is adjacent said hub and said second radial segment is adjacent said cylinder.

4. A torsional spring, as set forth in claim 1, wherein each of said elastomeric spokes has a preselected circumferential and axial dimension corresponding to a desired spring force of said torsional spring and one of the axial and circumferential dimensions of said first radial segment is proportional to the radial distance from said hub.

5. A torsional spring, as set forth in claim 1, wherein each of said elastomeric spokes has a cross-sectional area that varies along the spoke in proportion to its distance from said hub.

6. A torsional spring, as set forth in claim 1, wherein each of said elastomeric spokes extends between said inner circumferential surface of said cylinder and said hub along a line substantially tangential to said hub.

7. A torsional spring, as set forth in claim 1, wherein said hub has first and second axial end portions, a drive mechanism extending from said first axial end portion, and a recess extending into said second axial end portion, said drive mechanism and said recess having substantially similar cross sectional configurations whereby the recess is adapted to receive a drive mechanism of a similarly configured torsional spring.

8. A torsional spring, comprising:
a cylinder having an inner and outer circumferential surface;
a hub positioned substantially centrally within said cylinder; and
a plurality of elastomeric spokes extending radially between said inner circumferential surface of said cylinder and said hub along a line substantially tangential to said hub, each of said elastomeric spokes being formed from first and second elastomeric radial segments wherein the first radial segment has a lower elastic modulus than the second radial segment, said elastomeric spokes being adapted for resisting rotational movement of said hub relative to said cylinder throughout the entire range of motion of said hub relative to said cylinder by being placed in tension.

9. A torsional spring, as set forth in claim 8, wherein each of said elastomeric spokes has a preselected circumferential and axial dimension corresponding to a desired spring force of said torsional spring and each elastomeric spoke is formed from first and second radial segments, said first radial segment being adjacent said hub and having a lower elastic modulus than said second radial segment.

10. A torsional spring, as set forth in claim 9, wherein said first radial segment is formed from a first elastomeric material and said second radial segment is formed from a second elastomeric material wherein said first elastomeric material has a lower elastic modulus than said second elastomeric material.

11. A torsional spring, as set forth in claim 9, wherein one of the axial and circumferential dimensions of said first radial segment is proportional to the radial distance from said hub.

12. A torsional spring, as set forth in claim 9, wherein each of said elastomeric spokes has a cross-sectional area that varies along the spoke in proportion to its distance from said hub.

13. A torsional spring, as set forth in claim 8, wherein each of said elastomeric spokes is formed from a compound comprising approximately 80% natural rubber and 20% polybutadiene.

14. A torsional spring, as set forth in claim 8, wherein said hub has first and second axial end portions, a drive mechanism extending from said first axial end portion, and a recess extending into said second axial end portion, said drive mechanism and said recess having substantially similar cross sectional configurations whereby the recess is adapted to receive a drive mechanism of a similarly configured torsional spring.

15. A torsional spring for use in an exercise machine, comprising:
a cylinder;
a hub centered within the cylinder; and
a plurality of elastomeric spokes arcuately distributed between the cylinder and the hub, wherein an elastomeric inner end of each spoke is bonded generally tangential to the hub, and an elastomeric outer end of each spoke is bonded to the cylinder, each of said inner ends of said spokes having a lower elastic modulus than the elastic modulus of said outer end, said elastomeric spokes being adapted for resisting rotational movement of said hub relative to said cylinder throughout the entire range of motion of said hub relative to said cylinder by being placed in tension.

* * * * *